United States Patent Office 3,294,763
Patented Dec. 27, 1966

3,294,763
ORGANIC COMPOUNDS AND METHOD OF
MAKING SAME
William A. Hewett, Saratoga, John D. Michaelsen, Los
Gatos, and Jan F. Schimscheimer, Santa Clara, Calif.,
assignors to International Business Machines Corporation, Armonk, N.Y., a corporation of New York
No Drawing. Filed Oct. 19, 1964, Ser. No. 404,902
31 Claims. (Cl. 260—79.7)

The present application is a continuation-in-part of application 325,154, now abandoned.

The present invention generally relates to new organic compounds and more particularly relates to new alkenyl substituted dibenzofurans and alkenyl substituted dibenzothiophenes and methods of making the same, and to polymers prepared from the new alkenyl substituted dibenzofurans and alkenyl substituted dibenzothiophenes and methods of making the polymers.

Dibenzofuran, otherwise known as diphenylene oxide, is a crystalline solid with a melting point of about 87° C. and a boiling point of about 288° C. It is insoluble in water, soluble in hot alcohol and benzene and very soluble in ether. It is commercially used in the manufacture of a variety of chemical compounds requiring a heterocyclic ring structural formula. Benzofuran itself is also known as coumarone and can be made from coumarin. However, dibenzofuran is usually derived from coal tar rather than from synthesis from benzofuran.

Dibenzothiophene, otherwise known as diphenylene sulfide and 9-thiafluorene, is colorless crystalline solid with a melting point of about 98° C. and a boiling point of about 299° C. It is insoluble in water and soluble in alcohol, ether and sulfuric acid. It is commercially used in cosmetics and pharmaceuticals and as an organic intermediate.

The heterocyclic structure of dibenzofuran and dibenzothiophene renders them suitable for reaction with a variety of compounds. Accordingly, these compounds can be used in the manufacture of various chemicals, such as insecticides, dyes, pharmaceuticals, lubricants and the like.

It would be desirable to provide new dibenzofuran and dibenzothiophene derivatives which would have increased chemical reactivity, so as to permit the synthesis of new chemicals and other products having various desirable properties, both chemical and physical.

It also would be desirable to provide new reactive materials capable of polymerization to provide new polymeric products having controlled physical and chemical characteristics. In this respect, polymers comprise giant molecules each of which has been formed by the union of a considerable number of simple molecules or monomers with one another. The monomeric units in a given polymer may vary from two to a thousand or more. Homopolymers are those polymers which are formed from monomers all of which are substantially identical, while copolymers are polymers which are formed from two or more different kinds of monomers, for example, SBR synthetic rubber formed from the monomers styrene and butadiene.

Polymers have been classified according to their spatial arrangement of components, i.e. whether or not there are fixed positions in three dimensional space for the various atoms and parts of the polymeric molecular chain with respect to each other. Thus, polymers which have a definite and repeating spatial arrangement are known as stereospecific polymers, while those components which have only a random or varying spatial relationship with respect to one another are known as nonstereospecific polymers. There are two major types of stereospecific polymers, isotactic and syndiotactic. Nonstereospecific polymers are generally designated atactic polymers.

The isotactic arrangement is one in which if the macromolecule could be stretched out in a two dimensional plane, the substitutent atoms or group of atoms would be arranged, in the idealized form, so that they would be either above or below the same side of the main or backbone chain of the molecule. The syndiotactic arrangement is such that if the macromolecule were stretched out in a two dimensional plane some of the substituent groups would be above the plane in the backbone chain and the remainder below, but all in a definite symmetrical pattern. The atactic arrangement is where there is no definite symmetrical pattern or relationship with respect to the substituent groups above and below the backbone chain, if the chain were to be stretched out in a two dimensional plane.

There are a wide variety of polymers which are commercially available. Those polymers, such as polyethylene, polyvinyl chloride, polyvinylidene chloride, polyurethane and urea-formaldehyde are extensively used in a wide variety of applications, including the preparation of synthetic fibers, heat and electrical insulating components, coating materials, binding materials, and structural materials, such as glass substitutes, ceramic substitutes, wood and metal substitutes and the like.

Generally, the higher the molecular weight of the polymer the more viscous, solid and inelastic the polymer. Accordingly, even one type of polymer containing a single type of monomer varies widely in physical characteristics, depending on its molecular weight, i.e. number average, monomeric unit multiplication.

In view of the wide current use and the extensive potential application of polymeric substances, it would be desirable to provide new types of polymers from readily and controllably polymerizable substances. Such substances should preferably include various reactive groups capable of accepting or exchanging a wide variety of substituents, for suitable modification of the chemical and physical nature of the polymers.

Accordingly, it is the principal object of the present invention to provide new organic compounds.

It is also an object of the present invention to provide new methods of making new organic compounds.

It is a further object of the invention to provide new organic monomers capable of polymerization.

It is also an object of the present invention to provide new methods of making new organic monomers capable of polymerization.

It is a still further object of the present invention to provide new polymeric compounds.

It is a still further object of the invention to provide new methods of making new polymeric compounds.

These and other objects are accomplished, in accordance with the present invention, by providing new organic monomers in the form of alkenyl substitued dibenzofurans and alkenyl substituted dibenzothiophenes of a selected nature, methods of making the same polymers prepared from such monomers and methods of making the polymers. Thus, both the monomers and the polymers can be made in an efficient controllable manner to provide desired chemicals and physical properties in the products. The monomers are useful for a number of purposes, including the preparation of new chemicals, pharmaceuticals, fungicides, insecticides, dyes, and other chemical compounds and the polymers prepared from the monomers are also suitable for a variety of purposes, for example as electrical insulation, synthetic fibers, and materials used in the preparation of binders, coatings and the like. Furthermore, such polymers are capable of reacting with selected sensitizers to provide new polymeric-containing products, such as organic photoconductors and the like.

The foregoing and other objects, features and advantages of the invention will be apparent from the following more particular description of the preferred embodiments of the invention.

In preparing the new monomers comprising selected 4-alkenyl substituted dibenzofurans and 4-alkenyl substituted dibenzothiophenes, the method of the present invention is employed. This method comprises reacting a heterocyclic compound having the following general formula:

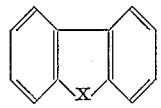

wherein X is selected from the group consisting of oxygen and sulfur with an alkali metal compound to provide a 4-alkali metal substituted heterocyclic compound having the following general formula:

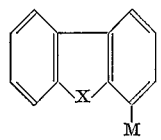

wherein X is selected from the group consisting of oxygen and sulfur, and wherein M is selected from the group consisting of sodium, potassium and lithium. A variety of reactive alkali metal-containing compounds can be used to place the alkali metal atom in the 4-position on the heterocyclic compound. For example, n-butyllithium can be used. In addition, other alkali metal compounds which are sufficiently reactive can be employed, for example the following: sodium hydride, potassium hydride, lithium hydride, sodium ethyl and potassium ethyl.

The 4-alkali metal substituted heterocyclic compound is then reacted with a suitable alkenyl substituent-yielding compound so that an alkenyl substituent-yielding component is substituted for the alkali metal at the 4-position. Depending upon the carbon chain length of the desired alkenyl substituent, the substituent can be transferred per se, or formed in situ on the heterocyclic compound, either from an alcohol or a monohalogenated alkene. The final result is 4-alkenyl substituted heterocyclic compound having the following general structural formula:

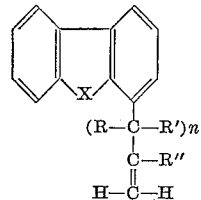

wherein X is selected from the group consisting of oxygen and sulfur and, wherein each of R, R' and R" are selected from the group consisting of hydrogen, alkyl, aryl, substituted alkyl and substituted aryl substituents, and wherein $n=0$–21.

Referring more particularly to the preparation of 4-alkali metal substituted dibenzofuran and 4-alkali metal substituted dibenzothiophene, the desired reaction can be carried out under anhydrous and non-oxidizing conditions, such as a nitrogen atmosphere and at any suitable temperature, for example, 0–35° C., or room temperature in the case of n-butyllithium and while both reactants are dispersed within a suitable anhydrous reaction medium or solvent. For example, dibenzofuran and n-butyllithium can be reacted at 35° C. while they are dissolved in anhydrous diethyl ether.

The reaction of the alkali metal compound and the heterocyclic compound of the present invention normally proceeds substantially to completion in the absence of a catalyst. Yields of up to about 80 percent or more can usually be obtained for the 4-alkali metal substituted dibenzofuran and 4-alkali metal substituted dibenzothiophene. As an example, reaction of dibenzofuran and n-butyllithium in diethyl ether at room temperature can be completed in 3 hours for a 60 percent of theoretical yield of 4-lithium dibenzofuran.

U.S. Patent 2,498,473 discloses 4-vinyl dibenzofuran as a side product in the preparation of 2-vinyl dibenzofuran, but does not suggest the novel method of the present invention of preparing 4-vinyl dibenzofuran as well as 4-vinyl dibenzothiophene. In the method of the present invention, anhydrous acetaldehyde is added dropwise to a solution of the 4-alkali metal-substituted dibenzofuran in, for example, diethyl ether at low temperature, e.g. 0° C. and under anhydrous non-oxidizing conditions, e.g., nitrogen atmosphere. The reaction is allowed to proceed at room temperature until completion. During such reaction, both 4-alkali metal dibenzofuran and 4-alkali metal dibenzothiophene are preferably disposed in a solvent therefor, for example, diethyl ether, dibutyl ether or another suitable ether, tetrahydrofuran, etc. The acetaldehyde can also be disposed in a suitable medium such as diethyl ether or the like. The reaction usually takes place relatively rapidly, for example within about 30 minutes, for a high yield of product, for example, 60 percent of theoretical. This product, which is either 4-(beta-hydroxy ethyl) dibenzofuran or 4-(beta-hydroxy ethyl) dibenzothiophene depending on the starting material, contains a secondary alcohol substituent disposed in the 4 position on the heterocyclic compound in place of the alkali metal and such product has the following structural formula:

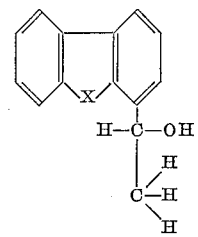

wherein X is selected from the group consisting of oxygen and sulfur. This secondary alcohol can then be dehydrated to the desired 4-vinyl under suitable dehydrating conditions, for example, at a temperature of 180° C. to 200° C., while in the presence of a polymerization inhibitor, such as hydroquinone, along with a dehydration catalyst in an effective concentration, for example, 1 percent, by weight of the substituted heterocyclic compound of the above formula, of potassium hydrosulfate. The mixture is rapidly heated under reduced pressure to the desired temperature and reacted for a short time, such as about 30 minutes, after which the product is recovered and purified by distillation at reduced pressure. Such product has the following structural formula:

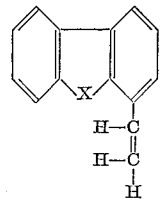

wherein X is selected from the group consisting of sulfur and oxygen.

In preparing the heterocyclic compounds wherein the alkenyl substituent has a carbon chain length of 3 or 5 to 23 carbon atoms, i.e.—$n=1$ and 3–21 in the general formula, the following technique is utilized.

The 4-alkali metal substituted heterocyclic compound, of the following general formula:

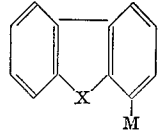

wherein X is selected from the group consisting of oxygen and sulfur and wherein M is selected from the group consisting of lithium, sodium and potassium, prepared in accordance with the foregoing, is reacted under non-oxidizing condition, e.g., nitrogen atmosphere and in the anhydrous state with a monohalogenated alkene carrying the same number of carbon atoms as the alkenyl substituent which it is desired to dispose in the heterocyclic compound, the monohalogenated alkene having the general structural formula:

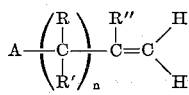

wherein A is selected from the group consisting of chlorine, bromine and iodine and wherein R, R' and R'' are each selected from the group consisting of hydrogen, alkyl, aryl, substituted alkyl and substituted aryl substituents and $n$ is selected from the group consisting of 1 and 3 to 21. Preferably, the alkyl substituents have 1 to 6 carbon atoms and the aryl substitutes have 6 to 12 carbon atoms. While the substituted alkyl and substituted aryl substituents are directed at alkyl and aryl substitutions, other substitutions which will not affect the reactability of the monohalogenated alkene also are contemplated.

The monohalogenated alkene is condensed with the 4-alkali metal-substituted heterocyclic compound of the above general formula to provide the desired alkenyl substituent on the heterocyclic compound at the site of the alkali metal atom. Such conditions are usually anhydrous non-oxidizing conditions, atmospheric pressure and a temperature somewhere within the range of between about 0° C. and 140° C. The alkali metal heterocyclic compound can be disposed within a suitable solvent therefor such as those listed above, which solvent is the same or is compatible and miscible with the solvent for the monohalogenated alkene. Suitable solvents for monohalogenated alkene are the following: diethyl ether, tetrahydrofuran, dibutyl etherate; or after the preparation of the lithiodibenzofuran in an ether type solvent, this solvent can be replaced with xylene, ethyl benzene, etc.

The reaction usually takes place relatively rapidly and is completed, for example, within about 6 hours. The product of the reaction is a 4-alkenyl substituted heterocyclic compound having the following structural formula:

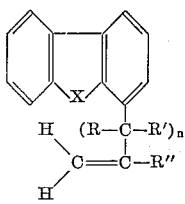

wherein X is selected from the group consisting of oxygen and sulfur, wherein R, R' and R'' are each selected from the group consisting of hydrogen, alkyl, aryl, substituted alkyl and substituted aryl substituents, and wherein $n=1$ or 3–21.

This product can be recovered and purified by any suitable procedure, for example by first stripping off the solvent and then using low pressure fractional distillation. The product can also be recovered and purified by pouring it into ice water, separating out the organic layer, ether extracting the water layer, combining the ether extracts with the organic layer, drying over anhydrous magnesium sulfate, evaporating to final dryness, dissolving the dried residue in hexane, filtering, evaporating the filtrate and recrystallizing the residue from methanol or the like. The yield of product is relatively high, for example about 60 percent of theoretical. This product is suitable for use in preparing the polymers of the present invention and for other purposes, such as the preparation of pharmaceuticals and the like.

In the case where it is desired to produce 4-butenyl dibenzofurans and 4-butenyl dibenzothiophenes, it is necessary to utilize one of two different techniques in order to avoid production of butadiene-type products.

In both techniques, previously mentioned, the 4-alkali metal substituted heterocyclic compound, prepared as previously described, is reacted under anhydrous, non-oxidizing conditions with a 1,4-dihalogenated butane having the following general structural formula:

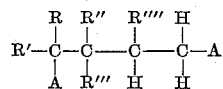

where R, R', R'', R''' and R'''' are each selected from the group consisting of hydrogen, alkyl, aryl, substituted alkyl, and substituted aryl substituents and wherein A is selected from the group consisting of chlorine, bromine and iodine. Again, it is preferred that the alkyl substituents have 1 to 6 carbon atoms and the aryl substitutes have 6 to 12 carbon atoms. While the substituted alkyl and substituted aryl substituents are directed at alkyl and aryl substitutions, other substitutions which will not affect the reactability of the monohalogenated alkene also are contemplated.

This reaction is carried out in a suitable reaction medium, which is a solvent for both the 1,4-dihalogenated butane and 4-alkali metal substituted heterocyclic compound. For example, 1,4-dihalogenated butane and 4-alkali metal substituted dibenzofuran both are soluble in diethyl ether and tetrahydrofuran.

The reaction is carried out at any suitable temperature, for example, refluxing temperature for 2 hours to provide a product which is a monohalogenated butyl heterocyclic compound having the following general formula:

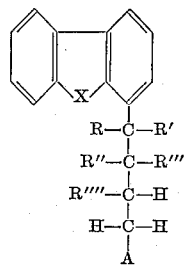

where X is selected from the group consisting of oxygen and sufur, where A is selected from the group consisting of chloride, bromine and iodine and where R, R', R'', R''' and R'''' are selected from the group consisting of hydrogen, alkyl, aryl, substituted alkyl, and substituted aryl substituents.

Following this, one technique involves dehydrohalogenation of the monohalogenated butyl heterocyclic compound under anhydrous non-oxidizing conditions utilizing a relatively strong dehydrohalogenating agent, for example, potassium tertiary butoxide, and under suitable strong reaction conditions, for example at refluxing temperature, to provide the desired finished product, 4-butenyl substituted dibenzofuran, having the formula:

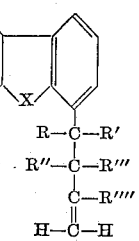

where X is selected from the group consisting of oxygen and sulfur, and where R, R', R", R''' and R"" are each selected from the group consisting of hydrogen, alkyl, aryl, substituted alkyl and substituted aryl groups. As an example, 4-lithium substituted dibenzofuran having the structural formula

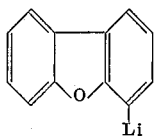

is added, while in anhydrous diethyl ether or tetrahydrofuran at refluxing temperature under a nitrogen atmosphere in a concentration of about 10 percent, by weight of the lithium dibenzofuran, to 1,4-dichlorobutane in anhydrous diethyl ether to prepare the new compound 4-monochlorobutyl dibenzofuran having the following formula:

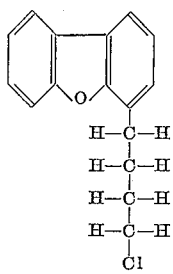

This product can be dehydrohalogenated under anhydrous non-oxidizing conditions utilizing potassium tertiary butoxide in a concentration of about 25 percent by weight of the monochlorobutyl dibenzofuran and at refluxing temperature to provide 4-butenyl substituted dibenzofuran, having the formula:

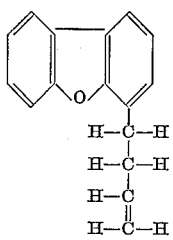

However, it has been found that the other technique is a more suitable method of obtaining the desired 4-butyl substituted heterocyclic compound of the above formula. This involves forming an amine from the 4(4-monohalogenated butyl) heterocyclic compound, oxidizing the amine and pyrolyzing the oxide to the desired product.

As an example, 4(4-bromobutyl)dibenzofuran can be reacted with dioxane and dimethylamine for about 12 hours, followed by extraction in benzene. The product can then be dried over anhydrous magnesium sulfate, saturated with anhydrous hydrogen chloride, then separated and dissolved in water. The water solution can be made basic with 10 percent NaOH and can be extracted with three portions of ether. The combined ether extracts can be dried over anhydrous magnesium sulfate, then solvent evaporated and cooled to crystallization. The product in methanol can be reacted at room temperature with 30 percent hydrogen peroxide, followed by decomposition of the excess peroxide with 10 percent palladium on charcoal, filtering and solvent removal. The amine oxide can be heated under vacuum to decompose the same to the 4-butenyldibenzofuran, after which the product can be dissolved in ether, washed successively with 10 percent HCl, 5 percent $NaHCO_3$ and $H_2O$, and dried over anhydrous magnesium sulfate. The residue can be crystallized to produce a yield up to about 80 percent or more of theoretical.

The 4-alkenyl substituted dibenzofurans and 4-alkenyl substituted dibenzothiophenes of this invention are further characterized in that they have a terminal double bond which is highly reactive and capable of acting as the site of polymerization of these monomers to form the desired polymers of the present invention. Moreover, substitution on the phenylene rings can take place utilizing various reactants to prepare products such as agricultural chemicals, pharmaceuticals and the like having the desired physical and chemical characteristics.

When the selected alkenyl substituted heterocyclic monomer of the above general formulas, prepared in accordance with the foregoing is polymerized through the double bond thereof, in accordance with the present invention, depending on the constituents of the polymerizable material a homopolymer or a copolymer can be formed. Thus, a single type of the above-described alkenyl substituted heterocyclic monomers can be polymerized to a homopolymer. Alternatively, two or more types of the above-described alkenyl substituted dibenzofurans can be copolymerized to a suitable copolymer. Block copolymers can also be formed.

A block copolymer is a copolymer whose molecule is formed of at least two monomers, each of which is grouped in comparatively long sections and is separated from one or more sections of the other monomers. Accordingly, blocks of one type of the above-described alkenyl substituted heterocyclic monomers can be interspersed with blocks of another type of the above-described alkenyl substituted heterocyclic monomers, both of which types are within the definition of the above set forth structural formula. An example of such a block copolymer is 4(4-pentenyl) dibenzofuran-4(5-hexenyl) dibenzofuran copolymer which has the formula:

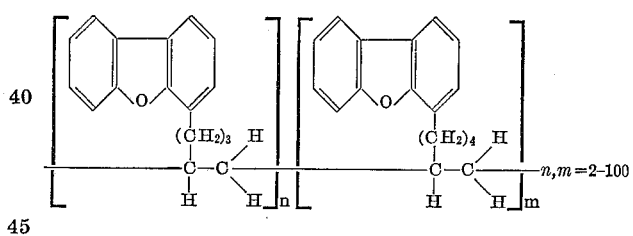

In yet another polymerization reaction in accordance with the present method, a 4-alkenyl-substituted heterocyclic monomer within the definition of the above set forth general structural formula, can be reacted with another polymeric-forming material such as pentene-1 or the like, to form a copolymer which can, if desired, be a block polymer.

The molecules of the homopolymers formed in accordance with the method of the present invention can be in tactic or atactic array, depending upon the particular polymerization conditions employed.

In accordance with the method of the present invention, material containing 4-alkenyl-substituted heterocyclic monomers of the above general formula, is polymerized in the presence of a suitable polymerizing catalyst and under suitable polymerizing conditions to form polymeric products containing 4-alkenyl-substituted monomeric units having the following structural formula:

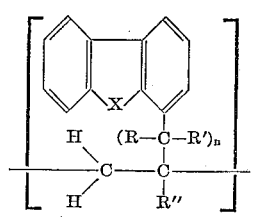

where X is selected from the group consisting of oxygen and sulfur, and where R, R' and R'' are each selected from the group consisting of hydrogen, alkyl, aryl substituted alkyl and substituted aryl substituents and $n=0-21$.

Accordingly, the polymer of the invention may have the following structural formula:

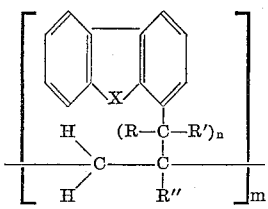

where X is selected from the group consisting of oxygen and sulfur, where R, R' and R'' are each selected from the group consisting of hydrogen, alkyl, aryl, substituted alkyl and substituted aryl substituents, wherein $n=0-21$ and wherein $m=2-1000$. During the polymerizing reaction, the 4-alkenyl-substituted heterocyclic monomer of the above general formula is preferably contacted with the polymerization catalyst while dissolved in or dispersed in a suitable reaction medium, for example, an aromatic solvent, such as benzene, toluene or xylene or tetrahydrofuran, or a paraffinic solvent, such as hexane, pentane, etc. The polymerizing temperature may be any suitable temperature, but usually is relatively low, for example, between about 0° C. and about 100° C., and the polymerization catalyst may be of any such suitable catalyst.

One type of initiator or catalyst for selected polymerization reactions is a substance which provides a free radical as, for example, the radicals formed upon the decomposition of benzoyl peroxide. Another such catalyst is tertiary-butyl peroxide. The polymerization effected is a typical chain addition reaction wherein the growing polymer chain is formed by consecutive addition of the monomeric units.

The chain reaction in the free radical-type of catalyzed polymerization reaction typically proceeds by the stages of initiation, propagation and termination. The initiation involves the reaction of a free radical with a monomer to obtain a new radical which grows by successive additions of the monomeric units. At intermediate stages during such polymerization, the monomer is usually still present, together with polymers comparable in size to those present in the final stages. The chain reaction can be terminated when two chain radicals couple with each other. Alternatively, the chain reaction can be terminated by disproportionation. Apparently, the initiator or catalyst, that is the free radical precurser, is actually incorporated into the polymer.

In the case of disproportionation, one of two free radical-containing polymers acquires a hydrogen atom from another free radical-containing polymer so as to reach the saturated state, i.e., a non-free radical-containing state, whereas the donor of the hydrogen atom acquires a double bond and, accordingly, also is satisfied and reaches a non-free radical-containing state, thus terminating the chain reaction.

A second type of catalyst provides an ionic type of reaction. Lewis acids such as aluminum chloride, boron fluoride, stannic chloride or the like are typical cationic catalysts. In such instances, the polymerization is initiated by the formation of a carbonium ion, usually by the transfer of a proton. Propagation then proceeds as in the peroxide-induced polymerization reactions of the free radical type, and the chain reaction terminates by the loss of a proton, with the production of an unsaturated terminal unit.

The polymerization reaction can also proceed utilizing anionic catalysts such as Lewis bases, such as sodamide. Various other types of catalysts can be used, such as Grignard type catalysts. Ziegler-Natta catalysts can also be used. Such a catalyst is a chemical complex derived from a transition metal halide from Group IV to Group VIII of the periodic table and a metal hydride or metal alkyl of a metal from Group I to Group III of the periodic table. A typical example of the Ziegler-Natta catalyst is a complex of titanium trichloride and diethyl aluminum chloride. Such catalysts usually cause stereospecific polymerization under anhydrous conditions, such as are employed in the present method. For example, diethyl aluminum chloride can be used in a mixture with titanium trichloride in a mole ratio to each other of 2:1 in the present polymerization method. The alkenyl-substituted heterocyclic monomer may be present in any suitable concentration with respect to the catalyst, for example, of about 0–100:1.

The polymerization reaction is terminated when the product has the desired physical characteristics, or in accordance with the foregoing description. The product is then recovered, and may be purified if desired. High yields of product can be obtained, for example, about 30 to about 80 percent of theoretical for the polymerization reaction. It will be understood that the particular temperature, pressure, and other parameters for the reaction, as well as the yield will necessarily vary, depending upon the particular catalyst, and the particular monomer or monomers to be polymerized and also the extent of polymerization desired. Moreover, the particular means by which the resulting polymer is recovered and purified will necessarily depend upon the characteristics, both physical and chemical, of the polymer, the reaction medium, the catalyst and other factors. The recovery of such materials in purified form from unreacted constituents, reaction medium catalyst and the like can be effectively carried out by one skilled in the art, based upon the information set forth herein. A typical recovery procedure for a typical polymer, such as polyheptenyl dibenzofuran polymerized by a Ziegler-Natta catalyst having a monomeric unit multiplication of about 500 is set forth as follows: the polymerization reaction is killed with anhydrous HCl-methanol (10%) mixture, and the product is then placed in a large volume of methanol, filtered and rewashed with methanol to provide a pure product. These polymers are suitable for use in the preparation of electrical insulators, synthetic fibers, coatings, binders and the like. As one example, poly-4(4-pentenyl) dibenzofuran can be converted into an improved photoconductor by mixing it in a concentration of about 7 percent, by weight, with benzene, and then adding thereto a photosensitizer comprising 2,5-diphenyl para benzoquinone in a concentration of about 3 moles per 100 moles of monomeric units in the polymer. The photoconductor thus prepared exhibits increased photosemiconductive capacity when exposed to light in the yellow portion (4200 A.) of the photospectrum. When a coating 0.5 mil thick (when dried) of this product is disposed in the wet state on an aluminum plate and dried, such resultant dry film can be charged by a corona unit to, for example, 650 volts in the dark. The dried film is capable of rapidly increasing its electrical conductivity upon exposure to yellow light, so that approximately one-half the initial voltage decays in about 300 milliseconds upon exposure to a 100 watt high pressure mercury arc lamp.

The following examples illustrate certain features of the invention. In each example, the reactions for the preparation of the monomer are carried out under anhydrous, non-oxidizing conditions, such as in anhydrous solvents and under blankets of inert gas such as nitrogen, unless otherwise indicated. The polymerization reactions are carried out under anhydrous conditions and usually non-oxidizing conditions.

Example I 4-vinyldibenzofuran having the following formula is prepared according to the following procedure:

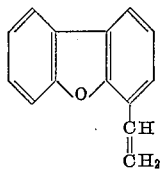

4-lithiodibenzofuran is first prepared by reacting 220 gm. of dibenzofuran in 500 ml. of diethyl ether solvent with 19 gm. of lithium and 122 gm. of butyl chloride in 100 ml. of diethyl ether solvent at 35° C. for 3 hours. The resulting 4-lithiodibenzofuran is then reacted in its solvent with 134 gm. of acetaldehyde, the addition reaction being carried out at 0° C. temperature and at atmospheric pressure over a period of 30 minutes. The reaction product is hydrolyzed with dilute aqueous HCl (10% by volume), and substituted dibenzofuran having the following structural formula is isolated:

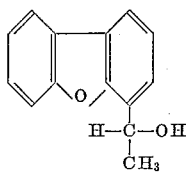

This compound is distilled at 170° C. at 1 mm. Hg pressure and recrystallized from hexane to a purified product having a melting point of 69–69.5° C. and the following analysis:

Analysis for $C_{14}H_{12}O_2$—Mol. wt.=212.25. Calculated: C=79.22; H=5.70. Found: C=79.32; H=5.60.

The purified product is then dehydrated at 200° C. for 30 minutes with 800 mg. of 1-$KHSO_4$ dehydration catalyst. The product, 4-vinyldibenzofuran, is then recovered from the reaction mixture by fractionation. The 4-vinyldibenzofuran has a boiling point of 122° C. at 0.45 mm. Hg and the following analysis:

Analysis for $C_{14}H_{10}O$—Mol. wt.=194.23. Calculated: C=86.57; H=5.19. Found: C=86.84; H=5.33.

The purified product is obtained in a yield of about 60 percent of theoretical.

The 4-vinyldibenzofuran monomer thus produced is thereupon polymerized in accordance with the following procedure. About 10 gm. of the 4-vinyldibenzofuran monomer and 0.1 gm. of benzoyl peroxide polymerization catalyst are mixed together and reacted at 50° C. for 72 hours until a number average monomeric unit multiplication of about 300 is obtained. Thereupon the so-produced polymer is separated from the catalyst and reaction medium by the following procedure: the polymer mass is dissolved in benzene, and the resulting solution is filtered. The polymer is precipitated therefrom with large volumes of methanol, filtered, and dried for about 16 hours at 40° C.

The product is examined by X-ray and identified as a poly-4-vinyldibenzofuran in atactic form having the following approximate characteristics: intrinsic viscosity—0.38; appearance—white powder; softening point—215° C. This polymer, poly-4-vinyldibenzofuran, is useful in the production of insulation, binders and coatings.

Example II 4-vinyldibenzofuran, prepared as in Example I, is polymerized as follows: about 10 gm. of the 4-vinyldibenzofuran, which also contains 0.01 gm. of benzoyl peroxide polymerization catalyst, is reacted at 50° C. for 72 hours until a number average monomeric unit multiplication of about 500 is obtained. Thereupon, the so-produced polymer is separated from the catalyst and reaction medium in the manner set forth in Example I.

The product is examined by X-ray and determined to be a poly-4-vinyldibenzofuran in atactic form with an intrinsic viscosity of 0.58.

Example III 4-vinyldibenzofuran prepared as in Example I is polymerized as follows: about 9.7 gm. of the 4-vinyldibenzofuran in 20 ml. of benezene solvent is contacted with a polymerization catalyst comprising 2 millimoles of $\gamma$-$TiCl_3$ and 5 millimoles diethyl aluminum chloride. The polymerization is carried out at 23° C. for 96 hours until a number average monomeric unit multiplication of about 10 units is obtained. Thereupon, the so-produced polymer is separated from the catalyst and reaction medium by the following procedure: the polymer mass is shaken with anhydrous HCl in methanol (10%) solution, filtered, washed with methanol, and vacuum oven dried for 16 hours at 40° C.

The product is examined by X-ray and determined to be a poly-4-vinyldibenzofuran in crystalline form having the following approximate characteristics: intrinsic viscosity—0.08; appearance—white powder; softening point—135° C; solubility—insoluble in diethyl ether, acetone and heptane.

Example IV 4-allyldibenzofuran having the following formula

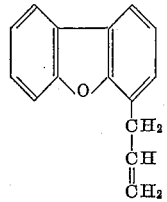

is prepared according to the following procedure. 4-lithiodibenzofuran is prepared by reacting 42 gm. of dibenzofuran in 250 ml. of diethyl ether solvent with 3.5 gm. of lithium and with 23 gm. of butyl chloride in 50 ml. of diethyl ether solvent at 35° C. for 3 hours. The diethyl ether is then replaced with an equal amount of anhydrous xylene. The 4-lithiodibenzofuran is then reacted in its solvent with 35 gm. of freshly distilled allyl chloride at reflux temperature for 16 hours. The desired product is isolated by distillation, and has a boiling point of 130° C. at 0.05 mm. Hg.

The 4-allyldibenzofuran thus produced is polymerized as follows: about 10 gm. of 4-allyldibenzofuran in 20 ml. benzene solvent is contacted with a polymerization catalyst comprising 2 millimoles $TiCl_4$ and 5 millimoles triethyl aluminum chloride. The polymerization is carried out at 23° C. for 96 hours until a number average monomeric unit multiplication of about 20 units is obtained. This polymer, poly-4-allyldibenzofuran, is isolated as in Example III and has an intrinsic viscosity of 0.07.

Example V 4-methallyldibenzofuran having the following formula

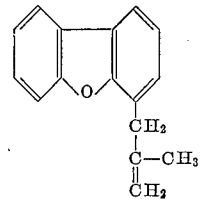

is prepared according to the following procedure. 4-lithiodibenzofuran is prepared by reacting 42 gm. of dibenzofuran in 250 ml. of diethyl ether solvent with 3.5 gm. of lithium and with 23 gm. of butyl chloride in 50 ml. of diethyl ether solvent at 35° C. for 3 hours. The diethyl ether is then replaced with an equal amount of anhydrous xylene. The 4-lithiodibenzofuran is then reacted in its solvent with 60 gm. of freshly distilled methallyl bromide at reflux temperature for 16 hours. The desired product is isolated by distillation and has a boiling point of 135° C. at 0.05 mm. Hg.

This product, in about 5 gm. amount, is disposed in 60 ml. of methylene chloride which also contains 0.2 gm. of boron trifluoride etherate polymerization catalyst. The temperature of the reactants is maintained at −78° C. for 6 hours, until the number average monomeric multiplication is approximately 12. Thereupon, the polymerization is stopped by the addition of ammonium hydoxide to the reaction mixture. The so-produced polymer is then separated from the catalyst, monomer and reaction medium by repeatedly washing it with methanol, i.e. until it is neutral in pH. The polymer is then filtered and dried. The purified polymer is chemically identified as poly-4-methallyldizenzofuran, which polymer is suitable for use as a component of an improved photoconductor, an electrical insulating material and for other purposes.

*Example VI*

4-(3-butenyl) dibenzofuran having the following formula

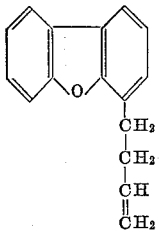

is prepared according to the following procedure. 4-lithiodibenzofuran is prepared by reacting 42 gm. of dibenzofuran in 250 ml. of tetrahydrofuran with 3.5 gm. of lithuim and with 23 gm. of butyl chloride in 50 ml. of tetrahydrofuran solvent at 35° C. for 3 hours. The 4-lithiodibenzofuran is then added to 540 gm. of 1,4-dibromobutane in 250 ml. of tetrahydrofuran, yielding 60 gm. of 4-(4-bromobutyl) dibenzofuran. About 12 gm. of this product in 120 ml. of dioxane is sealed into a glass tube with 20 ml. of dimethylamine. The tube is heated for 12 hours at 100° C. The contents of the tube are extracted with benzene, washed with 10% aqueous NaOH, then washed with water until neutral, and dried over anhydrous magnesium sulfate. The solvent is evaporated and the 4-(4-dimethylaminobutyl) dibenzofuran is obtained. This compound, in 6.7 gm. amount, in 55 ml. of absolute methanol is oxidized with 3.0 ml. 30% hydrogen peroxide to yield the amine oxide which when decomposed at 75–150° C. over a 0.5 hour period yields 4 gm. of 4-(3-butenyl) dibenzofuran, having a boiling point of 145° C. at 0.06 mm. Hg.

The 4-(3-butenyl) dibenzofuran thus produced is polymerized as follows: 4 gm. of the 4-(3-butenyl) dibenzofuran in 10 ml. of benzene is contacted with polymerization catalyst comprising 1 millimole of γ-TiCl$_3$ and 2.5 millimoles of diethyl aluminum chloride. The polymerization is carried out at 50° C. for 24 hours until a number average monomeric unit multiplication of about 15 is obtained. The polymer, poly-4-(3-butenyl) dibenzofuran, is isolated as in Example III and has an intrinsic viscosity of 0.09.

*Example VII*

4-(4-pentenyl) dibenzofuran having the following formula

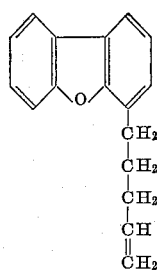

is prepared according to the following procedure. 4-lithiodibenzofuran is prepared by reacting 22 gm. of dibenzofuran in 200 ml. of diethyl ether solvent with 1.9 gm. lithium and with 16.5 gm. of butyl bromide in 50 ml. of diethyl ether solvent at 35° C. for 3 hours. The diethyl ether solvent is then replaced with an equal amount of anhydrous xylene. The 4-lithiodibenzofuran is then reacted in its solvent with 22 gm. of freshly distilled 5-bromo-1-pentene at reflux temperature for 16 hours. The desired product is isolated by distillation and has a boiling point of 137° C. at 0.04 mm. Hg, and the following analysis:

Analysis for $C_{17}H_{16}O_1$—Mol. wt.=236.32. Calculated: C=86.40; H=6.82. Found: C=85.40; H=7.50.

The 4-(4-pentenyl) dibenzofuran thus produced is polymerized as follows: about 10 gm. of 4-(4-pentenyl) dibenzofuran is contacted with polymerization catalyst comprising 2 millimoles of γ-TiCl$_3$ and 5 millimoles of diethyl aluminum chloride. The polymerization is carried out at 23° C. for 96 hours until a number average monomeric unit multiplication of about 100 units is obtained. The polymer, poly-4-(4-pentenyl) dibenzofuran, is isolated as in Example III and has an intrinsic viscosity of 0.28.

*Example VIII*

4-(4-pentenyl) dibenzofuran is prepared in the same manner as set forth in Example VII and is polymerized to a lower molecular weight polymer than in Example VII by the addition of zinc diethyl thereto. About 5 gm. of the monomer is disposed in 50 ml. of n-heptane which also contains polymerization catalyst comprising 2 millimoles γ-TiCl$_3$ and 5 millimoles diethyl aluminum chloride, as well as 0.05 millimole of zinc diethyl. The polymerization is carried out at 50° C. for 72 hours until a number average monomeric unit multiplication of about 50 is obtained. The polymer, poly-4-(4-pentenyl) dibenzofuran, is isolated as in Example III and has an intrinsic viscosity of 0.15.

*Example IX*

Poly-4-(4-pentenyl) dibenzofuran having a number average monomeric unit multiplication of about 40 is prepared in accordance with the procedure of Example VIII, except that no zinc diethyl is present and, instead, 20 ml. (standard pressure) of hydrogen is present, the reaction being carried out in a suitable pressure vessel. The temperature of the reactants is maintained at 70° C. for 24 hours. A yield of about 2 gm. of polymer is obtained. The purified polymer has an intrinsic viscosity of 0.13.

Example X 4-(5-hexenyl) dibenzofuran having the following formula

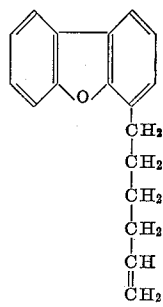

is prepared according to the following procedure. 4-lithiodibenzofuran is prepared by reacting 22 gm. of dibenzofuran in 200 ml. of diethyl ether solvent with 1.9 gm. lithium and with 16.5 gm. of butyl bromide in 50 ml. of diethyl ether solvent at 35° C. for 3 hours. The diethyl ether solvent is then replaced with an equal amount of anhydrous xylene. The 4-lithiodibenzofuran is then reacted in the solvent with 24 gm. of freshly distilled 6-bromo-1-hexene at reflux temperature for 16 hours. The desired product is isolated by distillation, and has a boiling point of 145° C. at 0.04 mm. Hg.

The 4-(5-hexenyl)dibenzofuran thus produced is polymerized in the same manner as set forth in Example VII to poly-4-(5-hexenyl) dibenzofuran having an intrinsic viscosity of 0.32.

Example XI

Poly-4-(4-pentenyl)-4-(5-hexenyl) dibenzofuran, a copolymer of 4-(4-pentenyl) dibenzofuran and 4-(5-hexenyl) dibenzofuran, is prepared as follows. A mixture of 2.4 gm. of 4-(4-pentenyl) dibenzofuran and 2.5 gm. of 4-(5-hexenyl) dibenzofuran is disposed in 30 ml. of benzene which also contains polymerization catalyst comprising 2 millimoles of $\gamma$-TiCl$_3$ and 5 millimoles of diethyl aluminum chloride. The temperature of the reactants is maintained at 50° C. for 72 hours. The desired copolymer is isolated in the same manner as set forth in Example III.

Example XII 4-(6-heptenyl) dibenzofuran having the following formula

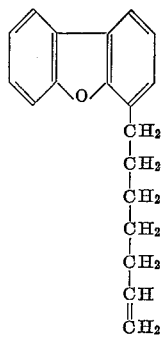

is prepared according to the following procedure. 4-lithiodibenzofuran is prepared by reacting 22 gm. of dibenzofuran in 200 ml. of diethyl ether solvent with 1.9 gm. lithium and with 16.5 gm. of butyl bromide in 50 ml. of diethyl ether solvent at 35° C. for 3 hours. The diethyl ether solvent is then replaced with an equal amount of anhydrous xylene. The 4-lithiodibenzofuran is then reacted in its solvent with 27 gm. of freshly distilled 7-bromo-1-heptene at reflux temperature for 16 hours. The desired product is isolated by distillation and has a boiling point of 150° C. at 0.04 mm. Hg.

The 4-(6-heptenyl) dibenzofuran thus produced is polymerized, in the same manner as set forth in Example VII, to the desired poly-4-(6-heptenyl) dibenzofuran.

Example XIII 4-(22-tricosenyl) dibenzofuran having the following formula

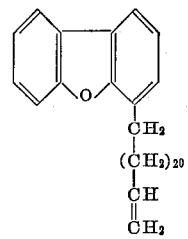

is prepared according to the following procedure. 4-lithiodibenzofuran is prepared by reacting 22 gm. of dibenzofuran in 200 ml. of diethyl ether solvent with 1.9 gm. lithium and with 16.5 gm. of butyl bromide in 50 ml. of diethyl ether solvent at 35° C. for 3 hours. The diethyl ether solvent is then replaced with an equal amount of anhydrous xylene. The 4-lithiodibenzofuran is then reacted in its solvent with 60 gm. of 23-bromo-1-tricosene at reflux temperature for 16 hours. The desired product is isolated and polymerized according to the procedure set forth in Example VII.

Example XIV 4-(10 phenyl-10 undecenyl) dibenzofuran having the following formula

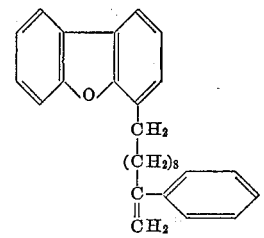

is prepared according to the following procedure. 4-lithiodibenzofuran is prepared by reacting 22 gm. of dibenzofuran in 200 ml. of diethyl ether solvent with 1.9 gm. lithium and with 16.5 gm. of butyl bromide in 50 ml. of diethyl ether solvent at 35° C. for 3 hours. The diethyl ether solvent is then replaced with an equal amount of anhydrous xylene. The 4-lithiodibenzofuran is then reacted in its solvent with 32 gm. of 2-phenyl-11-bromo-1-undecene at reflux temperature for 16 hours. The desired product is isolated and polymerized in accordance with the procedure set forth in Example V.

Example XV 4-vinyldibenzothiophene having the following structural formula is prepared according to the following procedure:

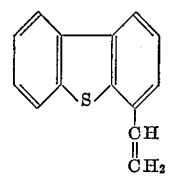

4-lithiodibenzothiophene is first prepared by reacting 220 gm. of dibenzothiophene in 500 ml. of diethyl ether solvent with 19 gm. of lithium and 122 gm. of butyl chloride in 100 ml. of diethyl ether solvent at 35° C. for 3 hours. The resulting 4-lithiodibenzothiophene is then reacted with 134 gm. of acetaldehyde, the addition reaction being carried out at 0° C. temperature and at atmosphere pressure over a period of 30 minutes. The hydrolyzed with dilute aqueous HCl (10% by volume), and substituted dibenzothiophene having the following structural formula is isolated:

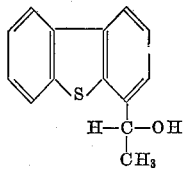

This compound is distilled at 170° C. at 1 mm. Hg pressure and recrystallized from hexane to a purified product having the following analysis:

Analysis for $C_{14}H_{12}OS$—Mol. wt.=228.32. Calculated: C=73.64; H=5.30; S=14.04. Found: C=73.87, 73.79; H=5.15, 5.08; S=14.04, 14.09.

The purified product is then dehydrated at 200° C. for 30 minutes with 800 mg. of $1\text{-}KHSO_4$ dehydration catalyst. The 4-vinyldibenzothiophene has a melting point of 52–54° C. and the following analysis:

Analysis for $C_{14}H_{10}S$—Mol. wt.=210.31. Calculated: C=79.96; H=4.76; S=15.23. Found: C=79.39, 79.20; H=5.00, 5.13; S=15.58, 15.58.

The purified product is obtained in a yield of about 60 percent of theoretical.

The 4-vinyldibenzothiophene monomer thus produced is thereupon polymerized in accordance with the following procedure. About 5 gm. of the 4-vinyldibenzothiophene monomer and 0.05 gm. of benzoyl peroxide polymerization catalyst are mixed together and reacted at 50° C. for 72 hours until a number average monomeric unit multiplication of about 300 is obtained. Thereupon the so-produced polymer is separated from the catalyst and reaction medium by the following procedure: the polymer mass is dissolved in benzene, and the resulting solution is filtered. The polymer is precipitated therefrom with large volumes of methanol, filtered, and dried for about 16 hours at 40° C. Upon examination, the polymer was identified as a poly-4-vinyldibenzothiophene having the following approximate characteristics: intrinsic viscosity—0.20; appearance—white powder.

*Example XVI*

4-vinyldibenzothiophene prepared as in Example XV is polymerized as follows: about 4 gm. of the 4-vinyldibenzothiophene in 20 ml. of benzene solvent is contacted with a polymerization catalyst comprising 1 millimole of $\gamma\text{-}TiCl_3$ and 2.5 millimoles diethyl aluminum chloride. The polymerization is carried out at 50° C. for 120 hours. Thereupon, the so-produced polymer is separated from the catalyst and reaction medium by the following procedure: the polymer mass is shaken with anhydrous HCl in methanol (10%) solution, filtered, washed with methanol, and vacuum oven dried for 16 hours at 40° C.

The product is examined by X-ray and determined to be a poly-4-vinyldibenzothiophene in crystalline form having the following approximate characteristics: intrinsic viscosity—0.04; appearance—white powder.

*Example XVIII*

4-(5-hexenyl) dibenzothiophene having the following formula:

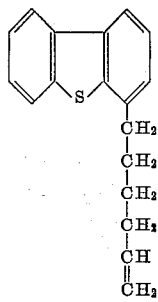

is prepared according to the following procedure. 4-lithiodibenzothiophene is prepared by reacting 22 gm. of dibenzothiophene in 200 ml. of diethyl ether solvent with 1.9 gm. lithium and with 16.5 gm. of butyl bromide in 50 ml. of diethyl ether solvent at 35° C. for 3 hours. The diethyl ether solvent is then replaced with an equal amount of anhydrous xylene. The 4-lithiodibenzothiophene is then reacted in the solvent with 24 gm. of freshly distilled 6-bromo-1-hexene at reflux temperature for 16 hours and 4-(5-hexenyl) dibenzothiophene is isolated by distillation.

The 4-(5-hexenyl) dibenzothiophene thus produced is polymerized, in the same manner as set forth for 4-(4-pentenyl) dibenzofuran in Example VII, to poly-4-(5-hexenyl) dibenzothiophene.

The preceding examples clearly illustrate that the new class of monomers and also the new class of polymers of the invention can be easily, simply and effectively prepared in accordance with the present method. The monomers comprise alkenyl substituted dibenzofurans and alkenyl substituted dibenzothiophenes wherein the alkenyl substituents have carbon chain lengths between 3 and 23 carbon atoms. The substituents themselves may be unsubstituted or may be substituted with alkyl, aryl, substituted alkyl or substituted aryl radicals at one or more appropriate locations, as previously indicated.

These new monomers are capable of reacting through the double bonds thereof to form the new class of polymers of the invention which can be homopolymers, copolymers, block copolymers and the like prepared in accordance with the present method. Moreover, the monomers are capable of reacting with other chemical compounds through the aromatic nucleus, and the double bonds thereof to prepare new chemicals which are suitable for use in pharmaceuticals, fungicides, insecticides, dyes, and other chemicals and chemical products. The polymers previously referred to each contain monomeric units having the following structural formula:

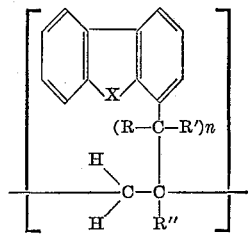

wherein X is selected from the group consisting of oxygen and sulfur, and wherein $n=1\text{-}21$ and R, R' and R'' are selected from the group consisting of hydrogen, alkyl, aryl, substituted alkyl and substituted aryl substituents. Moreover, the polymers, depending upon polymerization conditions, can be prepared, as clearly indicated in the foregoing examples, in tactic or atactic form. In addition, the physical and chemical characteristics of the polymers can vary, depending upon the particular monomers used, the extent of multiplication of the particular monomeric units and their arrangements within the polymer chain. The copolymers can have all the monomers or monomeric units thereof fall within the above set forth definition of the monomers, but in any event must include some monomeric units which fall within that definition, but may also include other polymerizable materials, such as propylene, 1-pentene or the like.

The preceding examples also particularly set forth that the present method can be carried out utilizing a variety of reaction times, temperatures, reaction media and catalysts, and initiators to effect both the preparation of the new class of monomers and the preparation of the new class of polymers. In the case of the monomers, the particular technique by which the alkenyl substituent is added to dibenzofuran and dibenzothiophene depends upon the chain length of the substituent. In the case of the polymers, the reaction can be carried out utilizing free radical, Friedel-Crafts, and Ziegler-Natta type polymerization reaction systems, as well as others. Such polymers have a wide variety of actual and potential uses, some of which are set forth in the preceding examples. However, various other uses have been found for the polymers, again depending upon the physical and chemical characteristics, their monomer unit multiplication, etc.

The present simple, effective, and rapid method provides the new monomers and new polymers in relatively high yield and in a reproducible manner. The physical and chemical characteristics of the products can be controlled by the selection of particular reactants and reaction parameters. Other advantages are set forth in the foregoing.

While the invention has been particularly described with reference to preferred embodiments thereof, it will be appreciated and understood by those skilled in the art that variations in form may be made therein without departing from the spirit and scope of the invention.

What is claimed is:

1. A composition of matter having the structural formula:

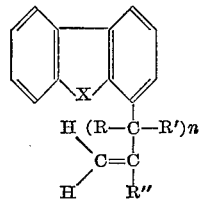

wherein X is selected from the group consisting of oxygen and sulfur, and wherein $n=1-21$ and wherein R, R' and R'' are each selected from the group consisting of hydrogen, aryl, alkyl, substituted alkyl, and substituted aryl substituents.

2. 4-(3-butenyl)dibenzofuran having the structural formula:

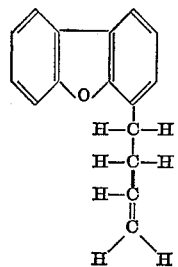

3. 4-(3-butenyl)dibenzothiophene having the structural formula:

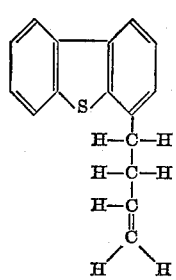

4. 4-(4-pentyl)dibenzofuran having the structural formula:

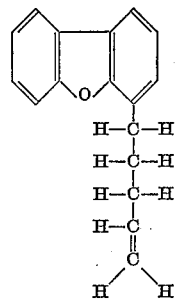

5. A composition of matter having the structural formula:

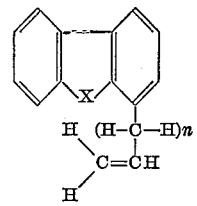

wherein X is selected from the group consisting of oxygen and sulfur, and wherein $n=1-21$.

6. 4-(5-hexenyl)dibenzofuran which has the following structural formula:

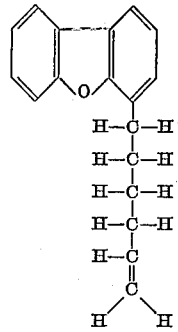

7. 4-(5-hexenyl)dibenzothiophene which has the following structural formula:

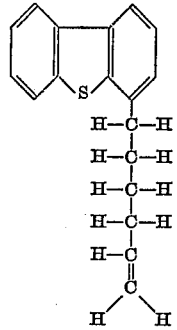

8. 4-(6-heptenyl)dibenzofuran which has the following structural formula:

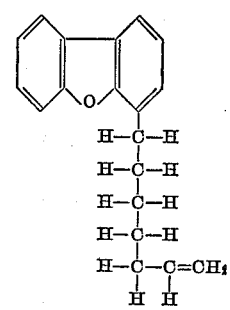

9. 4-allyldibenzofuran having the following structural formula:

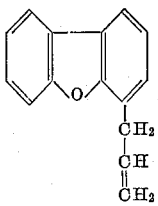

10. 4-methallyldibenzofuran having the following formula:

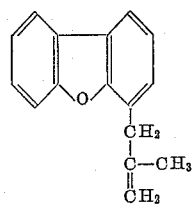

11. A new polymer which has the following structural formula:

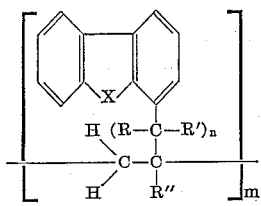

wherein X is selected from the group consisting of oxygen and sulfur, and
wherein R, R' and R'' are each selected from the group consisting of hydrogen, aryl, alkyl, substituted alkyl and substituted aryl substituents, wherein $n=1-21$ and where $m$, the number average monomeric unit multiplication$=2-1000$.

12. The polymer of claim 11 wherein said polymer is in a form selected from the group consisting of isotactic, syndiotactic and atactic forms.

13. A new copolymer, at least one of the monomers of which has the structural formula:

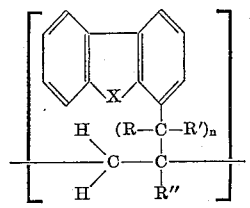

wherein X is selected from the group consisting of oxygen and sulfur, and
wherein $n=0-21$ and R, R' and R'' are each selected from the group consisting of hydrogen, alkyl, aryl, substituted alkyl, and substituted aryl substituents.

14. The new copolymer of claim 13 wherein said copolymer is in a form selected from a group consisting of isotactic, syndiotactic, and atactic forms.

15. The new copolymer of claim 14 wherein each of the monomeric units thereof have said structural formula and wherein the number average monomeric unit multiplication is 2-1000.

16. A new polymer which has the structural formula:

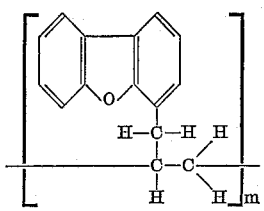

wherein $m=2-1000$.

17. A new polymer which has the structural formula:

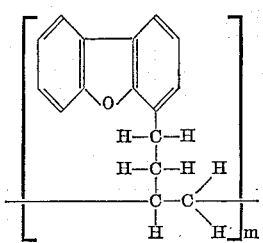

wherein $m=2-1000$.

18. A new polymer which has the structural formula:

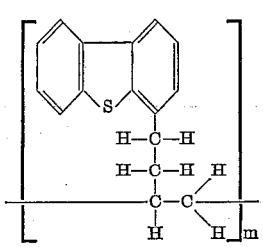

wherein $m=2-1000$.

19. A new polymer which has the structural formula:

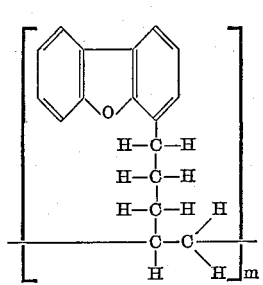

wherein $m=2-1000$.

20. A new polymer which has the structural formula:

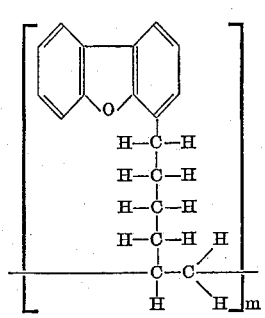

wherein $m=2-1000$.

21. A new polymer which has the structural formula:

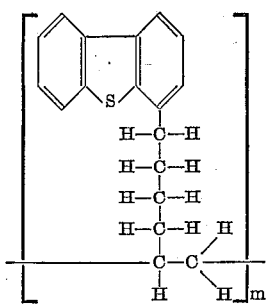

wherein $m = 2-1000$.

22. A new polymer which has the structural formula:

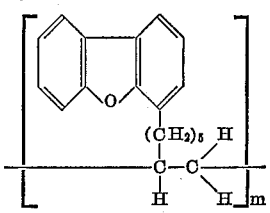

wherein $m = 2-1000$.

23. A new polymer which has the structural formula:

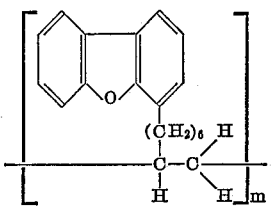

wherein $m = 2-1000$.

24. A new polymer which has the structural formula:

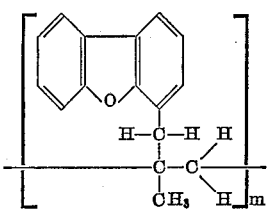

wherein $m = 2-1000$.

25. A method of making a 4-alkenyl substituted heterocyclic compound, which method includes the steps of:
reacting a heterocyclic compound having the following structural formula:

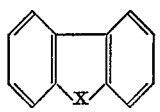

wherein X is selected from the group consisting of oxygen and sulfur, under non-oxidizing, anhydrous conditions with an alkali metal compound to form a 4-alkali metal substituted heterocyclic compound having the structural formula:

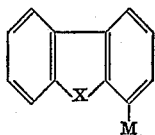

wherein X is selected from the group consisting of oxygen and sulfur, and wherein M is an alkali metal selected from the group consisting of sodium, potassium and lithium, thereafter
reacting under anhydrous, non-oxidizing conditions said 4-alkali metal substituted heterocyclic compound with an alkenyl-yielding compound, whereby an alkenyl-yielding substituent is condensed on said heterocyclic compound in replacement of said alkali metal, and
thereafter recovering 4-alkenyl substituted dibenzo heterocyclic compound having the structural formula:

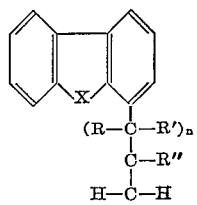

wherein X is selected from the group consisting of oxygen and sulfur, and wherein $n = 0-21$ and R, R' and R'' are each selected from the group consisting of hydrogen, alkyl, aryl, substituted alkyl and substituted aryl substituents.

26. A method comprising the steps of:
reacting a heterocyclic compound having the following structural formula:

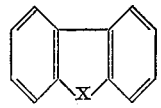

wherein X is selected from the group consisting of oxygen and sulfur, under anhydrous non-oxidizing conditions with an alkali metal yielding compound whereby a 4-alkali metal substituted heterocyclic compound is formed having the structural formula:

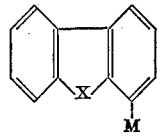

wherein X is selected from the group consisting of oxygen and sulfur, and wherein M is an alkali metal selected from the group consisting of sodium, potassium and lithium,
reacting under anhydrous non-oxidizing conditions said 4-alkali metal substituted dibenzo heterocyclic compound with acetaldehyde and then hydrolyzing the product, whereby a secondary alcohol is formed, having the structural formula:

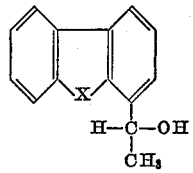

wherein X is the same as above, and
thereafter dehydrating said alcohol to form 4-vinyl heterocyclic compound having the structural formula:

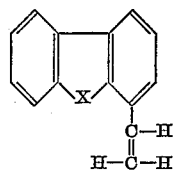

wherein X is the same as above.

27. The method of claim 26 wherein said alkali metal yielding compound is butyl lithium, wherein said alkali metal substituted heterocyclic compound is 4-lithiodibenzofuran and which reacts with acetaldehyde to form 4-(1-hydroxyethyl) dibenzofuran, and wherein said dehydration is effected in the presence of a dehydrating catalyst comprising $KHSO_4$ at about 180° C.

28. The method of claim 27 wherein said alkali metal yielding compound is butyl lithium, wherein said alkali metal substituted heterocyclic compound is 4-lithiodibenzothiophene and which reacts with acetaldehyde to form 4-(1-hydroxyethyl) dibenzothiophene, and wherein said dehydration is effected in the presence of a dehydrating catalyst comprising KHSO₄ at about 180° C.

29. A method comprising the steps of:
reacting a heterocyclic compound having the following structural formula:

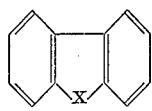

wherein X is selected from the group consisting of oxygen and sulfur, under anhydrous non-oxidizing conditions with an alkali metal-yielding compound to form a 4-alkali metal substituted heterocyclic compound having the structural formula:

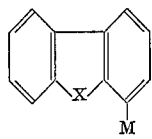

wherein X is selected from the group consisting of oxygen and sulfur, and wherein M is selected from the group consisting of sodium, potassium and lithium,
thereafter condensing under anhydrous non-oxidizing conditions said 4-alkali metal substituted heterocyclic compound with a 1,4-dihalogenated butane having the structural formula:

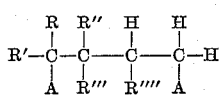

where R, R', R'', R''' and R'''' are each selected from the group consisting of hydrogen, alkyl, aryl, substituted alkyl and substituted aryl substituents and wherein A is selected from the group consisting of chlorine, bromine, and iodine and mixtures thereof, said condensing reaction being effected to form 4-monohalogenated butyl heterocyclic compound having the structural formula:

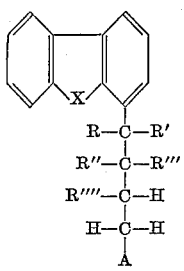

wherein X is selected from the group consisting of oxygen and sulfur, and wherein, R, R', R'', R''' and R'''' are each selected from the group consisting of alkyl, aryl, hydrogen and substituted alkyl and substituted aryl substituents, and wherein A is selected from the group consisting of chlorine, bromine and iodine, and
thereafter dehydrohalogenating under anhydrous non-oxidizing conditions said monohalogenated heterocyclic compound to form 4-butenyl heterocyclic compound having the structural formula:

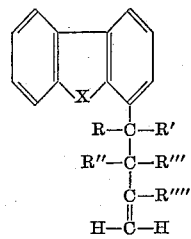

wherein X is selected from the group consisting of oxygen and sulfur, and wherein R, R', R'', R''' and R'''' are each selected from the group consisting of hydrogen, alkyl, aryl, substituted alkyl and substituted aryl substituents, said dehydrohalogenation of said monohalogenated butyl heterocyclic compound being effected in the presence of a dehydrohalogenating catalyst.

30. The method of claim 29 wherein said alkali metal-yielding compound comprises sodium hydride, wherein said alkali metal substituted heterocyclic compound comprises sodium dibenzofuran, wherein said dehydrohalogenating catalyst for the dehydrohalogenation of said monohalogenated butyl heterocyclic compound comprises potassium tertiary butoxide, and wherein said reaction is effected at about refluxing temperature.

31. The method comprising the steps of:
reacting under anhydrous non-oxidizing conditions a heterocyclic compound having the structural formula:

wherein X is selected from the group consisting of oxygen and sulfur, with an alkali metal-yielding compound to form a 4-alkali metal substituted dibenzofuran having the structural formula:

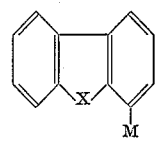

wherein X is the same as above, and wherein M is selected from the group consisting of sodium, potassium and lithium, and
thereafter reacting under anhydrous, non-oxidizing conditions said alkali metal substituted heterocyclic compound with a monohalogenated alkene having the structural formula:

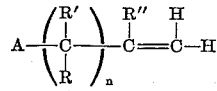

wherein n is selected from the group consisting of 1 and 3–21, wherein R, R' and R'' are each selected from the group consisting of hydrogen, alkyl, aryl, substituted alkyl and substituted aryl groups, and wherein A is selected from the group consisting of chlorine, bromine and iodine, whereby an alkenyl substituted heterocyclic compound is formed having the structural formula:

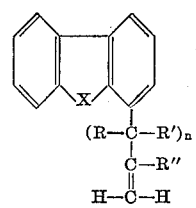

wherein X is the same as above, and wherein $n$ is selected from the group consisting of 1 and 3–21, and wherein R, R' and R'' are each selected from the group consisting of hydrogen, alkyl, aryl, substituted alkyl, and substituted aryl substituents.

References Cited by the Examiner

UNITED STATES PATENTS

| | | | |
|---|---|---|---|
| 2,146,730 | 2/1939 | Gilman | 260—346.2 |
| 2,498,473 | 2/1950 | Abbott | 260—88.5 |
| 2,499,186 | 2/1950 | Flowers et al. | 260—329.3 |
| 2,527,223 | 10/1950 | Kern | 260—80.3 |

OTHER REFERENCES

Gilman et al.: J.A.C.S., vol. 72 (pp. 2630–2632).

Gaylord and Mark: "Linear and Stereorgular Addition Polymers," 1959.

Journal of the Chemical Society, Greenhow et al., pp. 2848–51, 1951.

JOSEPH L. SCHOFER, *Primary Examiner.*

JAMES A. SEIDLECK, *Examiner.*

L. WOLF, D. K. DENENBERG, *Assistant Examiners.*